US011945667B2

(12) United States Patent
Ceniza et al.

(10) Patent No.: US 11,945,667 B2
(45) Date of Patent: Apr. 2, 2024

(54) ACCIDENT PREVENTION SYSTEM FOR A DOOR OR PASSAGEWAY

(71) Applicant: Toyota Motor Engineering & Manufacturing North America, Inc., Plano, TX (US)

(72) Inventors: Rommel B. Ceniza, Guelph (CA); Eddie Estanqueiro, Milton (CA)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 116 days.

(21) Appl. No.: 17/837,420

(22) Filed: Jun. 10, 2022

(65) Prior Publication Data
US 2023/0399185 A1    Dec. 14, 2023

(51) Int. Cl.
B65G 69/28    (2006.01)
(52) U.S. Cl.
CPC .................. B65G 69/2882 (2013.01)
(58) Field of Classification Search
CPC .................................................. B65G 69/2882
See application file for complete search history.

(56) References Cited

U.S. PATENT DOCUMENTS

| 4,122,629 | A   | * | 10/1978 | Rennick ............... B65G 69/005 |
|           |     |   |         | 49/70 |
| 8,547,234 | B2  |   | 10/2013 | Maly et al. |
| 10,040,676 | B2 | * | 8/2018 | Miller ..................... G01S 15/04 |
| 10,081,504 | B2 |   | 9/2018 | Walford et al. |
| 10,392,205 | B2 | * | 8/2019 | Boston ................... G08B 21/02 |
| 10,843,694 | B2 | * | 11/2020 | Schmidt ............... B60W 30/09 |
| 10,934,113 | B2 |   | 3/2021 | Hochstein et al. |
| 2012/0025964 | A1 | * | 2/2012 | Beggs ..................... G08G 1/166 |
|           |     |   |         | 340/435 |
| 2015/0013083 | A1 |   | 1/2015 | Palmersheim |
| 2015/0375947 | A1 | * | 12/2015 | Hochstein ................ G01V 8/20 |
|           |     |   |         | 250/216 |
| 2020/0024090 | A1 | * | 1/2020 | Mushynski ............ G08G 1/168 |

FOREIGN PATENT DOCUMENTS

JP    2008156093 A    3/2014

* cited by examiner

Primary Examiner — Mohamed Barakat
(74) Attorney, Agent, or Firm — Christopher G. Darrow; Darrow Mustafa PC

(57) ABSTRACT

An accident prevention system for a doorway of a loading dock is provided. The system includes a first sensor configured to detect an object in a first predetermined location and having a height that is greater than a predetermined height. A second sensor is configured to activate responsive to detection by the first sensor of an object having a height that is greater than the predetermined height. The second sensor is also configured to detect an object in a second predetermined location after activation of the second sensor. An alert system is configured to generate a humanly-perceivable alert responsive to detection of the object in the second predetermined location after the activation of the second sensor.

11 Claims, 5 Drawing Sheets

ACCIDENT PREVENTION SYSTEM FOR A DOOR OR PASSAGEWAY

TECHNICAL FIELD

The embodiments disclosed herein relate to safety systems and, more particularly, to a system designed to prevent a user from attempting to move an object having a certain height through a doorway or passage that is lower than the height of the object.

BACKGROUND

Load-bearing vehicles (such as forklift trucks) may transport loads of varying heights around warehouses and manufacturing facilities. A driver of such a vehicle is often unaware of height restrictions when moving loads through doorways or passageways, and may also be unaware of the height of the load he/she is transporting at any given time. In some cases, such as for loading dock doorways, the height of the passage may be much lower than the maximum height load that the vehicle is capable of transporting. An attempt to move an object through the passage when the object height exceeds the passage height may result in the object impacting a wall or other structure defining a portion of the doorway 24, at a location above the doorway. This may damage the doorway structure and/or cause the object to spill or tip over, thereby damaging the object and possibly injuring one or more human operators.

SUMMARY

In one aspect of the embodiments described herein, an accident prevention system for a doorway of a loading dock is provided. The system includes a first sensor configured to detect an object in a first predetermined location and having a height that is greater than a predetermined height. A second sensor is configured to activate responsive to detection by the first sensor of an object having a height that is greater than the predetermined height, the second sensor also being configured to detect an object in a second predetermined location after activation of the second sensor. An alert system is configured to generate a humanly-perceivable alert responsive to detection of the object in the second predetermined location after the activation of the second sensor.

In another aspect of the embodiments described herein, a method is provided for generating an alert indicating that a height of an object approaching a loading dock doorway exceeds a predetermined height. The method includes a step of determining, when the object is in a first predetermined location, that the height of the object exceeds the predetermined height. The method also includes a step of determining, after the determination that the height of the object exceeds the predetermined height that an object is in a second predetermined location. The method includes a step of generating a humanly-perceivable alert responsive to the determination that an object is in the second predetermined location.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

An accident prevention system for a doorway of a loading dock is provided. The system includes a first sensor configured to detect an object in a first predetermined location and having a height that is greater than a predetermined height. The predetermined height may be a maximum allowable height for transporting a load through the loading dock doorway. A second sensor is configured to activate responsive to detection by the first sensor of an object having a height that is greater than the predetermined height, the second sensor also being configured to detect an object in a second predetermined location after activation of the second sensor. An alert system is configured to generate a humanly-perceivable alert responsive to detection of the object in the second predetermined location after the activation of the second sensor. The alert system may be manually deactivated after the alert is generated. The user may then adjust the height of the object to a level below the predetermined height so that it may be transported through the loading dock doorway.

Figure 1:
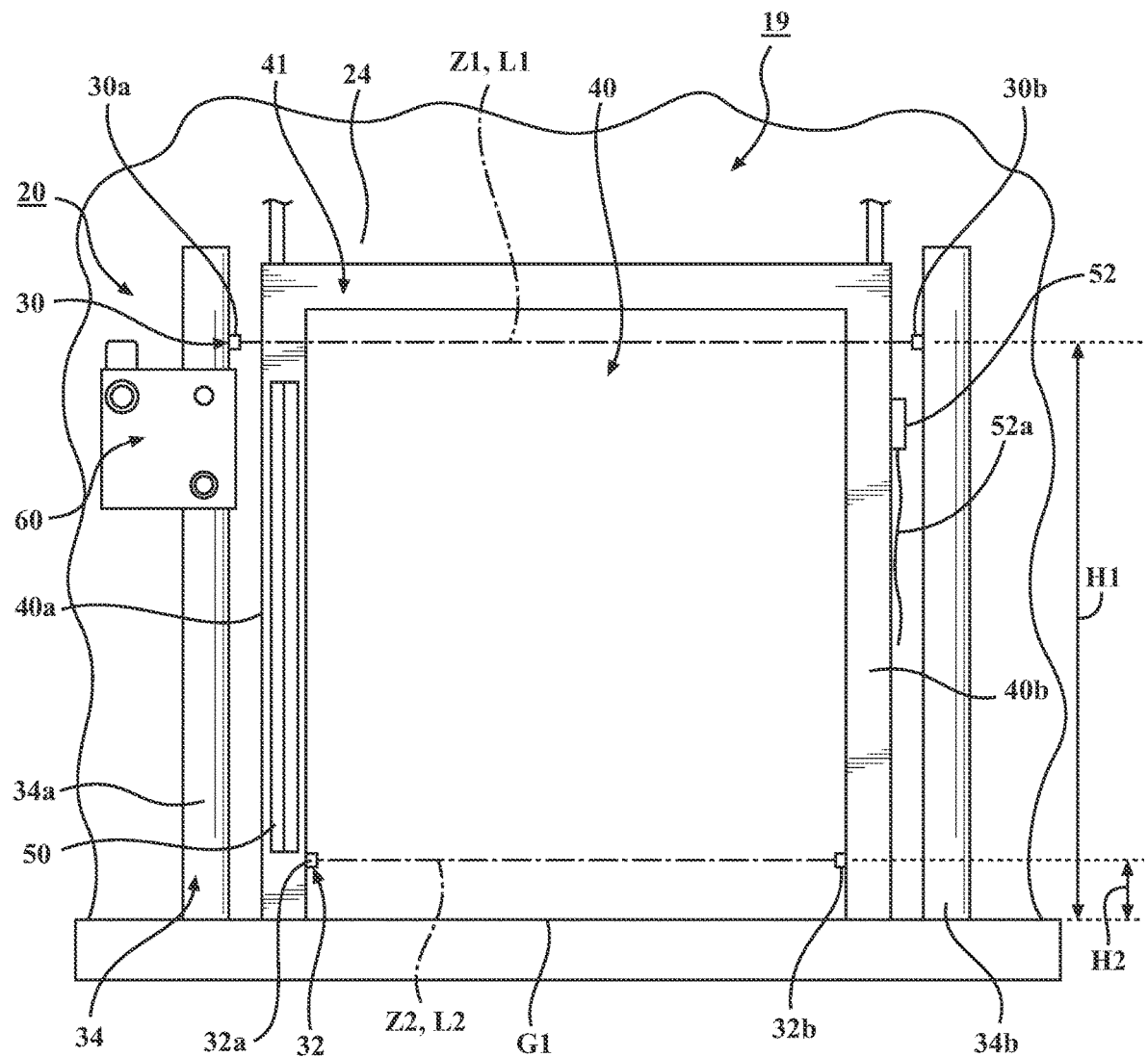
FIG. 1 is a schematic front view of a structure incorporating an accident prevention system for a doorway of a loading dock in accordance with an embodiment described herein.
Figure 2:
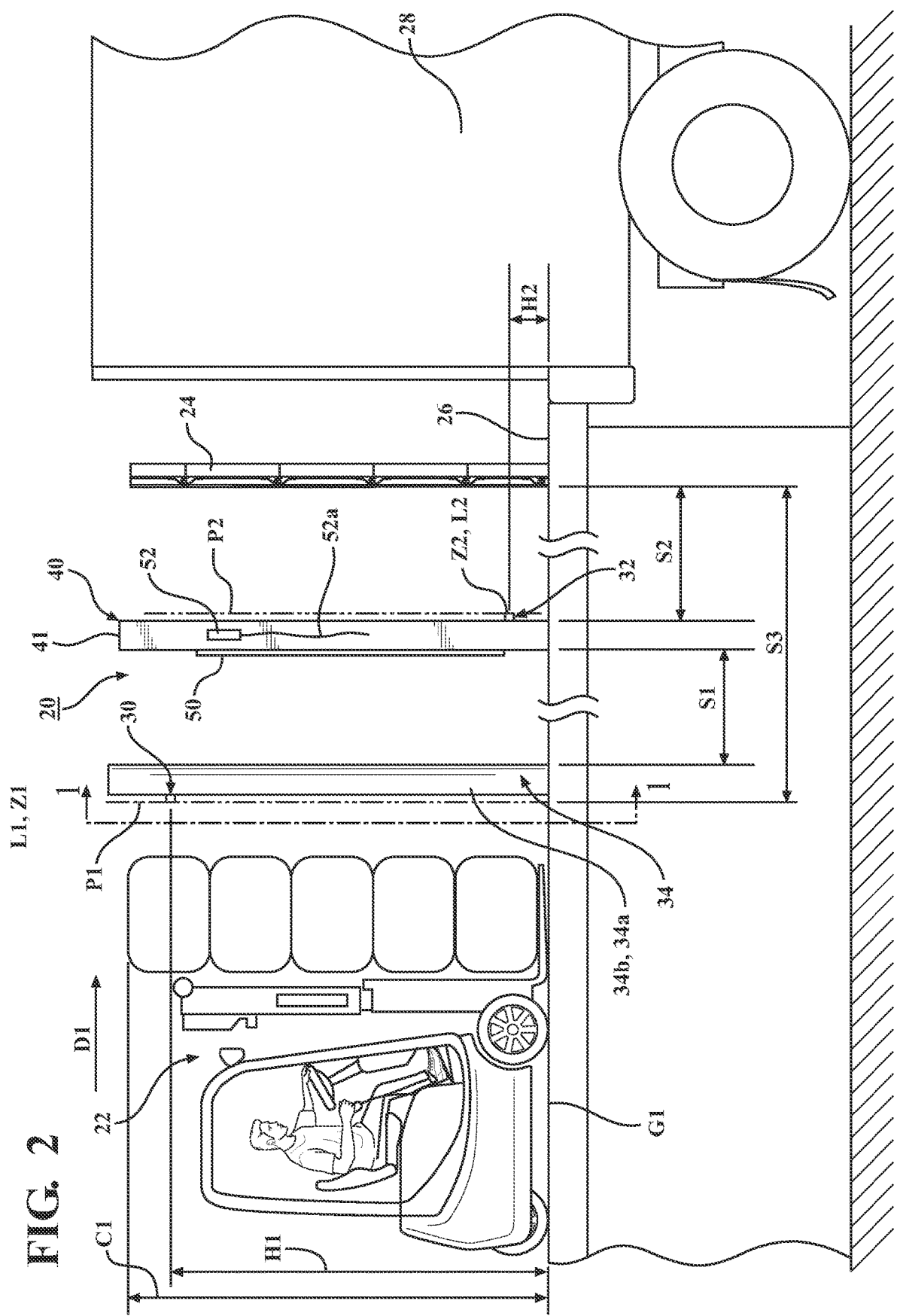
FIG. 2 is a schematic side view of the structure shown in FIG. 1.
Figure 3:
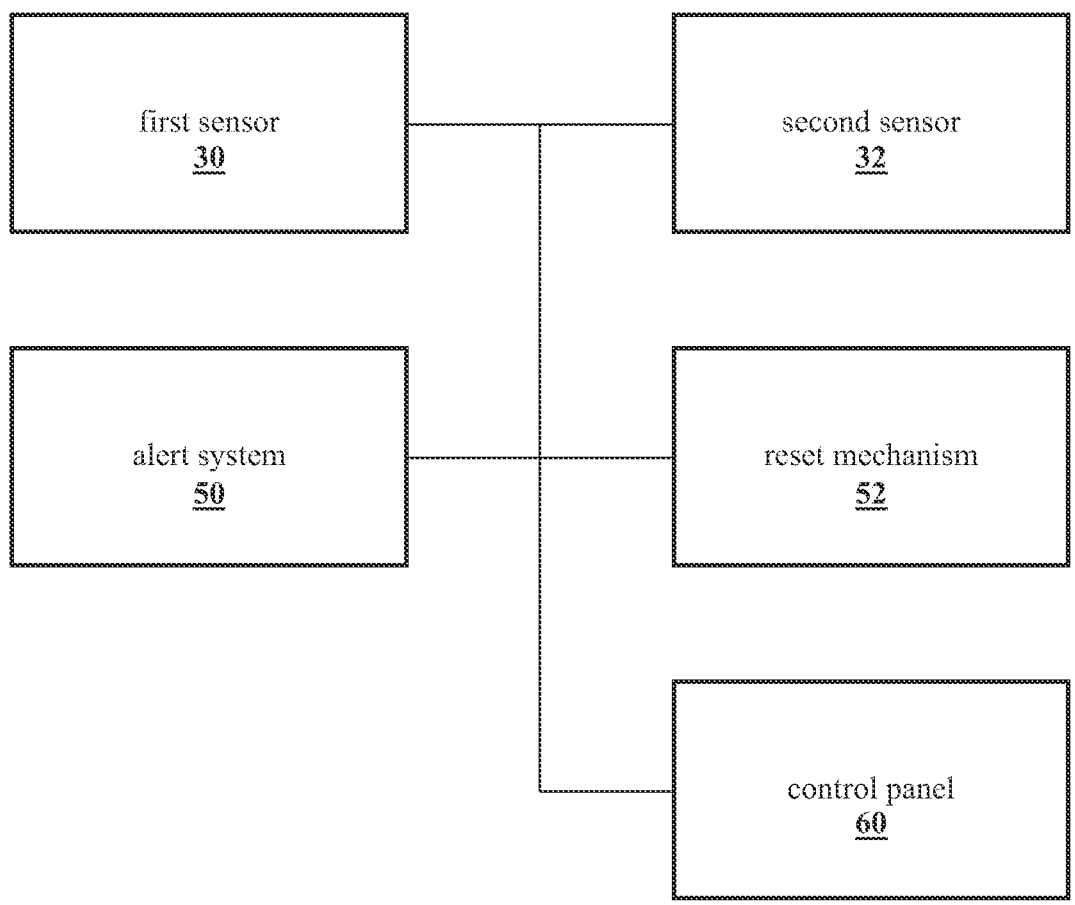
FIG. 3 is a block schematic diagram of an accident prevention system in accordance with an embodiment described herein.

FIG. 1 is a schematic front view of a structure 19 incorporating an accident prevention system 20 for a doorway 24 of a loading dock in accordance with an embodiment described herein. FIG. 2 is a schematic side view of the structure shown in FIG. 1. FIG. 3 is a block schematic diagram of an accident prevention system 20 in accordance with an embodiment described herein and incorporated into the structure 19 shown in FIGS. 1 and 2. Referring to the drawings, the system 20 may be configured to help prevent attempts to move an object 22 (such as load-bearing forklift or another vehicle or device) exceeding a predetermined height H1 through the loading dock doorway 24. Attempts to move an object 22 having a height exceeding the predetermined height H1 through the loading dock doorway 24 may result in the object impacting a wall or other structure defining the doorway 24, at a location above the doorway. This may damage the doorway structure and/or cause the object 22 (for example, cargo carried by a forklift) to spill or tip over, thereby damaging the object and possibly injuring one or more human operators.

The loading dock doorway 24 may be a doorway forming a passage between the interior of a structure (such as a plant or warehouse) and a loading dock 26 adjacent and exterior of the structure. The loading dock 26 may enable parking of a trailer or other vehicle 28 adjacent the structure to enable cargo to be unloaded from the vehicle 28 into the structure and to enable cargo to be loaded from the structure interior into the vehicle 28.

In one or more arrangements, the system 20 may include a first sensor 30 configured to detect when an object 22 is in a first predetermined location L1 and has a height C1 that is greater than the predetermined height H1. The object 22 may be a lift truck or other vehicle, a cart, a trailer, or any other device (including any cargo or load carried and/or moved by such a device) capable of moving or being moved from the first predetermined location L1 to the loading dock doorway 24.

The limiting predetermined height H1 may be a maximum allowable height for passing through the loading dock doorway 24 and may therefore be a height lower than the height of the loading dock doorway. The predetermined height H1 and the pertinent height of the loading dock doorway 24 may both be measured from a common reference surface (such as a ground surface G1 on which the object 22 is moving).

A "predetermined location" may be a location in a detection zone or "field of view" of a sensor mounted along a predetermined path of the object 22 to the loading dock doorway 24 and configured to detect the object 22 when the object meets certain conditions. The sensor detection zone may be a region of space in which an object may be detected by the sensor when it resides in the region of space. In embodiments described herein, first sensor 30 may have a detection zone Z1 and second sensor 32 may have a detection zone Z2. This, the first predetermined location L1 may be a location in detection zone Z1 (e.g., along the path of a laser beam traveling from an emitter 30a to a receiver 30b, in a case where first sensor 30 is a photosensor), and the second predetermined location L2 may be a location in detection zone Z2 (e.g., along the path of a laser beam traveling from an emitter 32a to a receiver 32b, where second sensor 32 is a photosensor).

In particular arrangements, as shown in FIGS. 1 and 2, the predetermined path to the loading dock doorway 24 may be a straight-line path (i.e., a path which does not require the object 22 to turn in order to proceed from the first predetermined location L1 to the loading dock doorway 24). In other particular arrangements, the predetermined path to the loading dock doorway 24 may incorporate one or more turns that the object 22 must navigate.

The sensors 30, 32 described herein may be positioned and configured to detect an object 22 passing through an associated portal. Placement of the sensors 30, 32 may depend on the physical structure defining the portal. The first sensor 30 may be any type of sensor suitable for the purposes described herein. In one or more arrangements, the first sensor 30 may be a proximity sensor. In other arrangements, and as shown in the embodiment of the drawings, the first sensor 30 may be a photoelectric sensor such as a laser sensor having an emitter 30a and a receiver 30b suitably mounted for detecting a height and presence of the object 22 when the object is in the first predetermined location L1 along a path leading to the loading dock doorway 24.

In one or more arrangements, the first predetermined location L1 may be at a first portal 34. For purposes described herein, a "portal" may be a defined region of space through which the object 22 will pass during movement of the object along the predetermined path to the loading dock doorway 24. The various portals described herein may be defined and positioned so as to guide the object 22 along the predetermined path toward the loading dock doorway 24. The path may lead through (or under) the first predetermined location L1 at which the height of the object 22 may be evaluated, through a second predetermined location L2 at which generation of an alert may be initiated if the height of the object exceeds the predetermined height H1, and then to the loading dock doorway 24.

In one or more arrangements, a location "at a portal" may be a location within or along a boundary of the portal. Referring to FIGS. 1 and 2, in one example of a portal, side edges of the first portal 34 (e.g., lateral boundaries of the first portal 34 extending generally perpendicular to a direction of motion D1 of the object 22 through the portal 34) may be formed by a pair of opposed, spaced-apart posts 34a, 34b extending vertically from a ground surface G1. An element of the first portal 34 extending in the direction of motion D1 along the predetermined path may include a vertical plane P1 extending through the sensor detection zone Z1. First sensor 30 (when mounted on posts 34a, 34b as shown) may be configured to detect an object 22 having a height of at least H1 passing through the first portal plane P1.

In another example, an element of the second portal 40 extending in the direction of motion D1 along the predetermined path may include a vertical plane P2 extending through the sensor detection zone Z2. Lateral boundaries of the second portal 40 may be formed by laterally-positioned elements 40a, 40b of the door jamb or doorway 41 through which the object 22 is to pass when moving along the predetermined path. Second sensor 32 (when mounted along or in the door jamb 41 as shown) may be configured to detect an object having a height of at least H2 passing through plane P2 and the second portal 40. Thus, in the manner just described, features defining the portal boundaries may serve as mounting structures for the various sensors.

In particular arrangements, a spacing S1 between the posts 34a, 34b forming the first portal 34 and the features forming the second portal 40 may be in the range 1.5-2 meters inclusive. Also, in particular arrangements, a spacing S2 between the features forming the second portal 40 and the loading dock doorway 24 may be in the range 1.5-2 meters inclusive.

The system 20 may include second sensor 32 configured to activate responsive to detection by the first sensor 30 of an object having a height that is greater than the predetermined height H1. The second sensor 32 may also be configured to detect an object in a second predetermined location L2 after activation of the second sensor. The second sensor 32 may be any type of sensor suitable for the purposes described herein. In one or more arrangements, the second sensor may be a proximity sensor. In other arrangements, and as shown in the embodiment of the drawings, the second sensor 32 may be a photoelectric sensor such as a laser sensor having an emitter 32a and a receiver 32b suitably mounted for detecting a presence of the object 22 when the object is in a predetermined location L2 along a path leading to the loading dock doorway 24.

In one or more arrangements, the second predetermined location L1 is between the first predetermined location L1 and the loading dock doorway 24 along a path from the first predetermined location L1 to the loading dock doorway 24. In the embodiment shown in the drawings, the second predetermined location L2 is a location defined by a second portal 40 positioned along the path to be followed by the object 22 leading from the first portal 34 to the loading dock doorway 24. In the examples shown in the drawings, the sensors 30 and 32 are mounted in or along the first and second portals 34, 40 so as to enable detection of the object 22 as it moves through the portals.

The second sensor 32 may be considered "activated" when it is powered and operable to detect an object in a second predetermined location L2 so as to activate the alert system 50 as described herein. In one or more arrangements, the second sensor 32 may be communicatively coupled to the first sensor 30 so that the second sensor 32 automatically activates responsive to detection by the first sensor 30 of an object in the first predetermined location L1 having a height above the predetermined height H1.

The system 20 may also include an alert system (generally designated 50) configured to generate a humanly-perceivable alert responsive to detection of the object 22 in the second predetermined location L2 after the activation of the second sensor 32. An alert is considered to be "humanly-perceivable" when it is structured to be perceivable by one or more human senses of a person controlling motion of the object 22 (for example, a human operator of a forklift truck transporting a load of cargo having a height above the predetermined height H1) or positioned within a predetermined distance of the object. Possible alerts may include flashing lights, audible alarm sounds, etc. In one or more arrangements, the alert system 50 may be communicatively coupled to the second sensor 32 so that the alert system 50 automatically activates responsive to detection by the second sensor 32 of an object 22 in the second predetermined location L2.

The system 20 may also include a manually-actuatable reset mechanism 52 configured to deactivate the alert system 50 and the second sensor 32 upon actuation of the reset mechanism. In one or more arrangements, the reset mechanism 52 may include a manually-graspable cord 52a suspended from a structure defining the second portal 40. The reset mechanism 52 may also have other, alternative forms.

Deactivation of the second sensor 32 may prevent activation of the alert system 50 until the second sensor 32 is activated again at a later time by detection of an excessive height of object 22 by the first sensor 30 as previously described. Deactivation of the alert system 50 may cease generation of all humanly-perceivable alert signals by the alert system 50 until the alert system is activated again at a later time by activation of the second sensor, in the manner previously described.

FIGS. 4A-7 illustrate various modes of operation of the accident prevention system 20.

Referring to FIGS. 1-2 and 4A-4B, in one or more arrangements, an object 22 having a height greater than the predetermined height H1 may enter the first predetermined location L1 as it passes through the first portal 34 traveling in a direction D1 toward the loading dock doorway 24. Because the object 22 has a height greater than the predetermined height H1, the object 22 may interrupt light from the first sensor emitter 30a to the receiver 30b (i.e., the object 22 may be in the first predetermined location L1 defined by the light beam from emitter 30a forming detection zone Z1). As a result of this interruption, the second sensor 32 may be activated. In one or more arrangements, the second sensor 32 may remain activated for a period of time after activation to enable the object 22 to proceed from the first predetermined location L1 to the second predetermined location L2. The second sensor 32 may be configured to self-deactivate if no object reaches the second predetermined location L2 within the specified time period after activation of the second sensor 32.

Figure 4A:
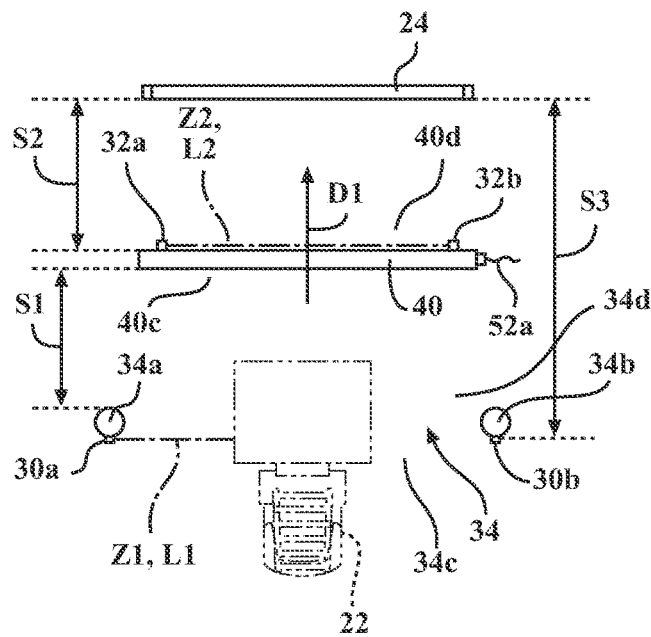
FIGS. 4A-4B are schematic plan views of the accident prevention system structure shown in FIGS. 1 and 2, showing operation of the system in one operational mode.
Figure 4B:
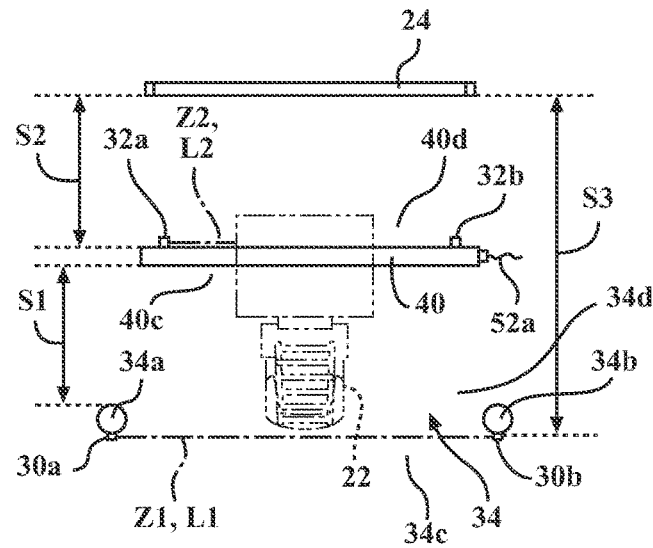

If the object 22 reaches the second predetermined location L2 (as shown in FIG. 4B by the object interrupting the light beam from emitter 32a) within the specified time period after activation of the second sensor 32, the second sensor 32 may activate the alert system 50, causing generation of the humanly-perceivable alert(s). To deactivate the alert system 50 and the second sensor 32, a user may pull the cord 52a to operate the reset mechanism 52. In one operational mode, operating the reset mechanism 52 with the object 22 still positioned in the second predetermined location L2 will deactivate the alert system 50 and the second sensor 32. The user may then, for example, "unstack" or remove a portion of the cargo being moved by the vehicle or otherwise act to reduce the height of the object 22 so that it will fall below the predetermined height H1 to allow safe movement of the object 22 through the loading dock doorway 24.

Figure 5:
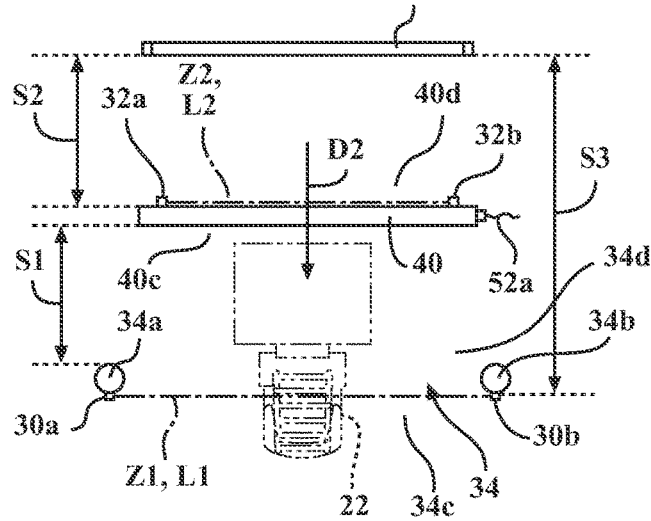
FIG. 5 is a schematic plan view of the accident prevention system structure shown in FIGS. 1 and 2, showing operation of the system in another operational mode.

Referring to FIG. 5, in another operational mode, the reset mechanism 52 may be configured so that actuation of the reset mechanism deactivates the alert system 50 and the second sensor 32 only after the object 22 has been removed from the second predetermined location L2 after the alert system 50 has been activated. Thus, in this arrangement, after detection of the object 22 by the second sensor 32 in the second predetermined location L2 and after activation of the alert system 50, the object 22 must be removed from the second predetermined location L2 (for example, by reversing or backing the object out of the second portal 40 in direction D2) before operation of the reset mechanism 52 will deactivate the second sensor 32 and the alert system 50.

Figure 6:
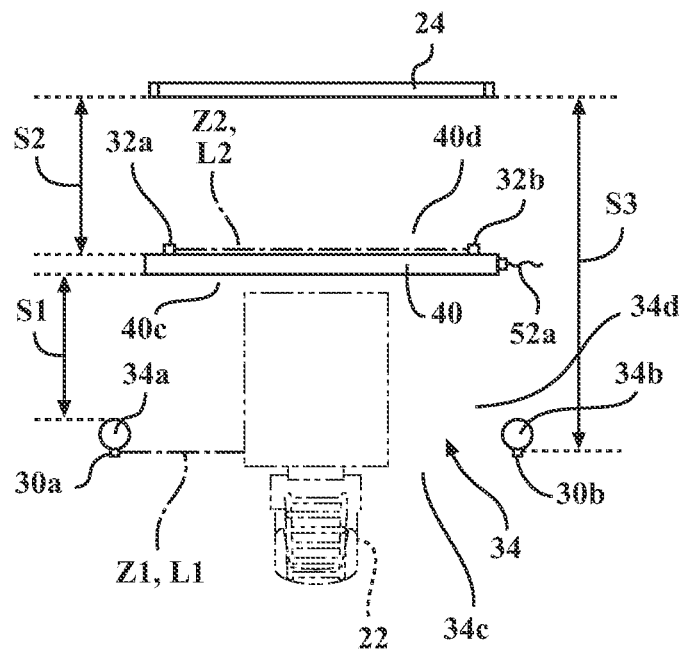
FIG. 6 is a schematic plan view of the accident prevention system structure shown in FIGS. 1 and 2, showing operation of the system in yet another operational mode.

Referring to FIG. 6, in yet another operational mode, the second sensor 32 may be configured to reactivate within a predetermined time period after being deactivated by the reset mechanism 52, responsive to detection by the first sensor 30 that the object 22 has a height that is greater than the predetermined height H1. This may occur, for example, if the object 22 is long enough so that a portion of the object still resides in the first predetermined location L1 when the second sensor 32 and alert system 50 are deactivated by operation of the reset mechanism 52.

Figure 7:
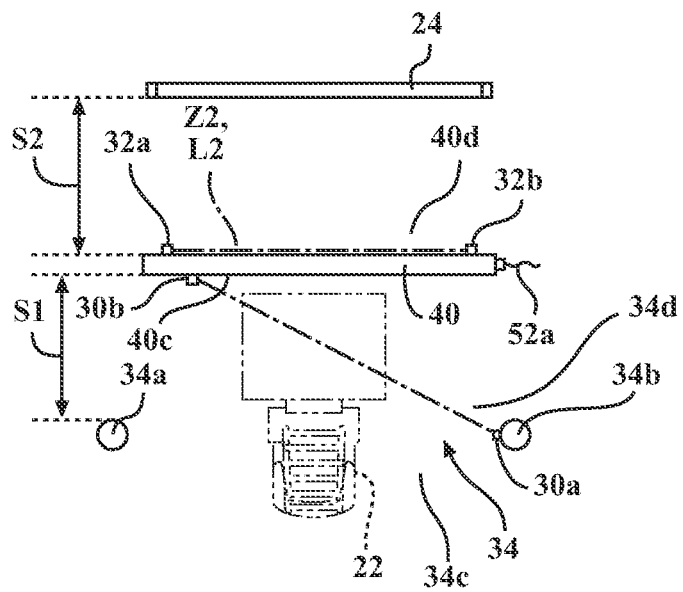
FIG. 7 is a schematic plan view of the accident prevention system structure shown in FIGS. 1 and 2, showing operation of the system in yet another operational mode.

Referring to FIG. 7, in particular arrangements, the first sensor 30 may be configured so that the first predetermined location L1 extends between the first portal 34 and the second portal 40. To this end, the first portal 34 may have a first portal first side 34c and a first portal second side 34d opposite the first side 34c. The second portal 40 may have a second portal first side 40c and a second portal second side 40d opposite the first side 40c. In addition, the first sensor 30 may be a photo-sensor including an emitter 30a mounted along one of the second portal first side 40c and the first portal second side 34d, and a receiver 30b mounted along the other one of the second portal first side 40c and the first portal second side 34d and configured to receive an emission from the emitter 30a. For example, FIG. 7 shows an arrangement in which an emitter 30a is mounted along the first portal second side 34d (on post 34b) and an associated receiver 30b is mounted along the second portal first side 40c (on door jamb element 40a) so as to enable the receiver 30b to receive an emission (such as a laser beam) from the emitter 30a.

In this arrangement, with the first predetermined location L1 residing between the first portal 34 and the second portal 40, detection of the object 22 by the first sensor 30 may still activate the second sensor 32 prior to the object 22 reaching the second predetermined location L2. The first sensor 30 may also detect when a height of the object 22 is above the predetermined height H1 when the object 22 still resides between the first and second portals 34, 40 and after the object 22 has been removed from the second predetermined location L2. Thus, if the user fails to reduce the height of the object 22 to below the predetermined height H1 after withdrawing the object 22 out of the second predetermined location L2 to a position between the first and second portals 34, 40, the excessive height condition may be detected by first sensor 30 when configured as shown in FIG. 7. The second sensor 32 may then be activated prior to the object 22 being moved again to the second predetermined location L2. Otherwise, if the first sensor 30 is configured as shown in FIGS. 4A-4B and the object 22 is moved to a position between the first and second portals 34, 40, then "unstacked", then moved back to the second predetermined location L2 without passing by the first sensor 30 after "unstacking", the first sensor 30 would not be able to detect a condition where the unstacking was insufficient to adequately reduce the height of the object 22, in which case the second sensor 32 would not be activated and an alert would not be generated when it is needed.

Referring again to FIG. 3, the control panel 60 may be operably and/or communicably coupled to any portions of the system 20 described herein. The control panel 60 may be configured for operation by a user to select any of the operational modes described herein, to enable a user to turn the accident prevention system "on" and "off", and to enable performance of other system and component control functions.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An accident prevention system for a doorway of a loading dock, the system comprising:
    a first sensor configured to detect an object in a first predetermined location and having a height that is greater than a predetermined height;
    a second sensor configured to activate responsive to detection by the first sensor of the object having a height that is greater than the predetermined height, the second sensor also being configured to detect the object in a second predetermined location after activation of the second sensor; and
    an alert system configured to generate a humanly-perceivable alert responsive to detection of the object in the second predetermined location after the activation of the second sensor.

2. The system of claim 1 wherein the first predetermined location is spaced apart a first predetermined distance from a loading dock doorway, and wherein the second predetermined location is between the first predetermined location and the loading dock doorway along a path from the first predetermined location to the loading dock doorway.

3. The system of claim 1 wherein the first predetermined location is location at a first portal and the second predetermined location is a location at a second portal spaced apart from the first portal and positioned along a path to be followed by the object leading from the first portal to the loading dock doorway.

4. The system of claim 3 wherein the first predetermined location is a location between the first portal and the second portal.

5. The system of claim 4 wherein the first portal has a first portal first side and a first portal second side opposite the first side, the second portal has a second portal first side and a second portal second side opposite the first side, and wherein the first sensor comprises a photo-sensor including an emitter mounted along one of the second portal first side and the first portal second side; and
    a receiver mounted along the other one of the second portal first side and the first portal second side and configured to receive an emission from the emitter.

6. The system of claim 1 further comprising a manually-actuatable reset mechanism configured to deactivate the alert system and the second sensor upon actuation of the reset mechanism.

7. The system of claim 6 wherein the reset mechanism is configured so that actuation of the reset mechanism deactivates the alert system and the second sensor only after the object has been removed from the second predetermined location after the alert system has been activated.

8. The system of claim 7 wherein the second sensor is configured to activate within a predetermined time period after being deactivated by the reset mechanism responsive to detection by the first sensor that the object has a height that is greater than the predetermined height.

9. A method of generating an alert indicating that a height of an object approaching a loading dock doorway exceeds a predetermined height, the method comprising steps of:
    determining, using a first sensor, and when the object is in a first predetermined location, that the height of the object exceeds the predetermined height;
    activating a second sensor responsive to detection by the first sensor that the object has a height greater than the predetermined height;
    determining, using the second sensor that the object is in a second predetermined location; and
    generating a humanly-perceivable alert responsive to the determination that the object is in the second predetermined location.

10. The method of claim 9 further comprising the step of discontinuing generation of the alert responsive to manual actuation of a reset mechanism.

11. The method of claim 9, wherein the second sensor is positioned along a path that the object is to follow from the first predetermined location to the loading dock doorway.

* * * * *